United States Patent
Earley et al.

[15] 3,681,341
[45] Aug. 1, 1972

[54] PROCESS FOR PREPARING 1-LOWER ALKYL-1,4-BENZODIAZEPIN-2-ONES

[72] Inventors: James Valentine Earley, Cedar Grove; Rodney Ian Fryer, North Caldwell; Robert Ye-Fong Ning, West Caldwell; Leo Henryk Sternbach, Upper Montclair, all of N.J.

[73] Assignee: Hoffmann-La Roche Inc., Nutley, N.J.

[22] Filed: Dec. 23, 1970

[21] Appl. No.: 101,188

[52] U.S. Cl. ...................260/239.3 D, 260/239 BD
[51] Int. Cl. ...........................................C07d 53/06
[58] Field of Search................................260/239.3 D

[56] References Cited

UNITED STATES PATENTS 3,462,418   8/1969   Archer et al...........260/239.3 D

*Primary Examiner*—Henry R. Jiles
*Assistant Examiner*—Robert T. Bond
*Attorney*—Samuel L. Welt, Jon S. Saxe, Bernard S. Leon, William G. Isgro and Margaret C. Bogosian

[57] ABSTRACT

A process for preparing 1-lower alkyl substituted 1,4-benzodiazepin-2-ones via the rearrangement of the corresponding imino ether is disclosed. The products obtainable by this process are known compounds and are useful as sedatives, anticonvulsants and muscle relaxants.

1 Claim, No Drawings

PROCESS FOR PREPARING 1-LOWER ALKYL-1,4-BENZODIAZEPIN-2-ONES

DESCRIPTION OF THE INVENTION

The present invention relates to a process for preparing known and pharmacologically valuable 1,4-benzodiazepine derivatives. More particularly, the present invention is concerned with the preparation of 1-lower alkyl-substituted-l,4-benzodiazepin-2-ones. The products obtainable following the instant process are useful as sedative, muscle relaxant and anti-convulsant agents.

Following the process of the present invention, one can prepare benzodiazepine derivatives of the formula

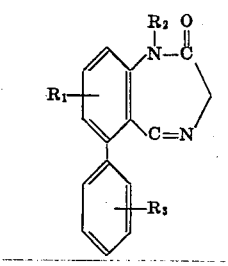

I wherein $R_1$ signifies hydrogen, halogen, nitro or trifluoromethyl; $R_2$ signifies lower alkyl; and $R_3$ signifies hydrogen or halogen.

As used throughout this disclosure, the term "lower alkyl" denotes both straight and branched chain saturated hydrocarbon groups containing from one to seven carbon atoms, preferably from one to four carbon atoms, for example, methyl, ethyl, propyl, isopropyl, butyl and the like. The term "halogen" relates to all four forms thereof, i.e., chlorine, fluorine, bromine and iodine unless indicated otherwise.

In following the novel process of the present invention, the known and useful compounds of formula I above are prepared by the thermal rearrangement of the corresponding imino ether of the formula

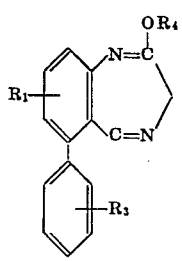

II wherein $R_1$ and $R_3$ are as described above and $R_4$ signifies lower alkyl.

In a preferred aspect of the present invention, $R_1$ in the starting material of formula II is halogen, $R_3$ is hydrogen or halogen located at the 2'-position of the benzodiazepine moiety, and $R_4$ is a lower alkyl group containing from one to four carbon atoms. In a more preferred aspect the $R_1$ substituent in the starting material of formula II is halogen, preferably chlorine, located at the 7-position of the benzodiazepine moiety, $R_3$ is hydrogen and $R_4$ is methyl; so that by following the novel process of the present invention there is obtained a compound of the formula

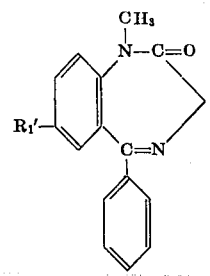

Ia wherein $R_1'$ signifies halogen.

The compounds of formula II above can be converted into compounds of formula I above by heating said compounds. This thermal treatment to effect rearrangement of the formula II compound can be accomplished in the presence or absence of an inert solvent. Suitable solvents for this purpose include high boiling point inert solvents such as mineral oil and the like.

When the rearrangement is accomplished in the absence of an inert solvent, the conversion is effected by merely heating the compounds of formula II to temperatures between about 220° and the decomposition point of the starting material. For this process aspect it is preferable to employ temperatures in the range of from about 240° to about 280°. Although reaction time is not a critical aspect of the instant process, it is preferable to effect the thermal rearrangement by heating the formula II compound for about 30 minutes to 3 hours.

When the thermal rearrangement is effected in the presence of an inert solvent, the reaction mixture should be heated to temperatures between 220° and the reflux temperature of the reaction mixture.

In effecting the thermal rearrangement, it is preferable to employ procedures which increase the reactive surface area, thus maximizing the heat exchange capabilities of the reaction. Thus, for example, if the formula II compound is heated in the presence of an inert solvent, the reaction mixture can be stirred during heating. Likewise, if thermal rearrangement is effected by heating the formula II compound in the absence of a solvent, the compound can be stirred mechanically or percolated by passing a stream of inert gas through the reaction container.

The compound of formula II used as the starting materials in the instant process may be prepared by treating a compound of the formula

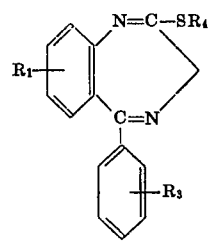

III wherein $R_1$, $R_3$ and $R_4$ are as described above with an alkali metal alkoxide such as sodium methoxide. The conversion of the formula III compound to the corresponding compound of formula II is expediently accomplished in the presence of an inert organic solvent. Suitable solvents for this purpose include alcohols such as methanol, ethanol and the like, and aromatic hydrocarbons such as benzene, toluene and the like. Although temperature and pressure are not critical to this process aspect, it is preferable to effect this reaction at elevated temperatures, most preferably at the reflux temperature of the reaction medium.

The compounds of formula III above are known or can be prepared in analogy to the preparation of known compounds.

The following Examples further illustrate the process of the present invention. All temperatures given are in degrees centigrade.

EXAMPLE 1

A 5 g. sample of 7-chloro-2-methoxy-5-phenyl-1,4-benzodiazepine was heated in a sealed tube for 30 minutes at 240°–260°. The tube was cooled, opened and the contents were partitioned between 500 cc of dichloromethane and 500 cc of dilute HCl. The organic layer was separated, dried and evaporated. The residue was crystallized from a small amount of benzene, dissolved in a small volume of methylene chloride and chromatographed over a column of 200 g. of neutral activated alumina. Hexane was used as the eluent until no more starting material was obtained. The eluent was then changed to dichloromethane, and was continued until all of the product was obtained. Removal of dichloromethane and recrystallization of the residue from a mixture of ether and petroleum ether gave 7-chloro-1,3-dihydro-1-methyl-5-phenyl-2H-1,4-benzodiazepin-2-one, m.p. 131°–132°.

The starting material was prepared as follows:

A mixture of 2.0 g. (0.00666 m) of 7-chloro-5-phenyl-2-thiomethyl-3H-1,4-benzodiazepine, 15 ml. of absolute methanol and 7 ml. of a solution of sodium methoxide in methanol (0.0047 m/ml.) was heated under reflux for 2.5 hours and then evaporated under reduced pressure to dryness. The residue was triturated with ether and the mixture was filtered. The filtrate was evaporated, dissolved in benzene and filtered over 50 g. of basic alumina. The benzene forerun was discarded and the alumina was then washed thoroughly with ether to give, after removal of solvent, 7-chloro-2-methoxy-5-phenyl-3H-1,4-benzodiazepine as white prisms, m.p. 88°–92°. Recrystallization from a mixture of ether and petroleum ether (30°–60°) gave the pure compound, m.p. 88°–94°.

We claim:

1. A process for preparing a compound of the formula

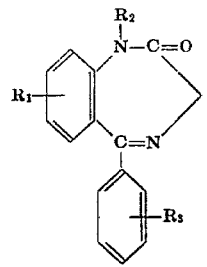

wherein $R_1$ signifies hydrogen, halogen, nitro or trifluoromethyl; $R_2$ signifies lower alkyl; and $R_3$ signifies hydrogen or halogen which comprises thermally rearranging a compound of the formula

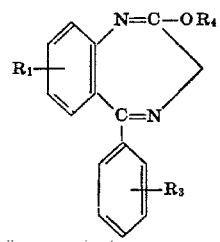

wherein $R_1$ and $R_3$ are as described above and $R_4$ signifies lower alkyl employing temperatures in the range of from about 220° C to about 280° C.

* * * * *